J. S. CAMPBELL.
Dental-Vulcanizer.

No. 217,728.    Patented July 22, 1879.

Witnesses
Chas. H. Smith
Harold Serrell

Inventor
John S. Campbell
per Lemuel W. Serrell
Atty

UNITED STATES PATENT OFFICE.

JOHN S. CAMPBELL, OF NORTH PLAINFIELD, NEW JERSEY.

IMPROVEMENT IN DENTAL VULCANIZERS.

Specification forming part of Letters Patent No. 217,728, dated July 22, 1879; application filed December 23, 1878.

*To all whom it may concern:*

Be it known that I, JOHN S. CAMPBELL, of North Plainfield, in the county of Somerset and State of New Jersey, have invented an Improvement in Dental Vulcanizers, of which the following is a specification.

Dental vulcanizers have been made with the vulcanizing-chamber above the water-vessel, and cocks have been used to admit steam, and safety-valves and thermometers have been combined with such vulcanizers.

My invention consists in two vessels, one within the other, between which the water and steam are employed to transmit heat to the contents of the inner vessel, such steam and water surrounding, or nearly so, the inner vessel for rendering the temperature uniform, and also for maintaining heat while the steam is shut off from the vulcanizing-vessel, or when the same may be opened for examining the molds. I provide a door at one side, that can be easily opened or closed steam-tight, and pressure can be applied to the molds as the material becomes heated.

By my improvement the molds can be inspected and pressure applied from time to time without the molds becoming cool. This is of great importance, especially with dental plates of celluloid, in which it is preferable to soften the rigid material by steam heat and then to apply the pressure without risk of injury to the molds, and after the mold is packed to finish the operation by dry heat, the steam being excluded from the vulcanizing-vessel.

Figure 1:
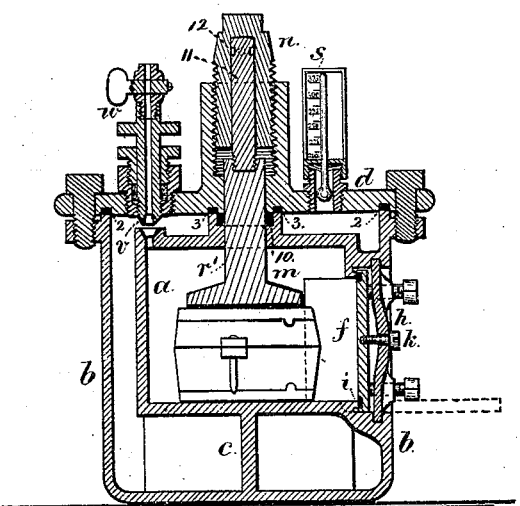
Figure 2:
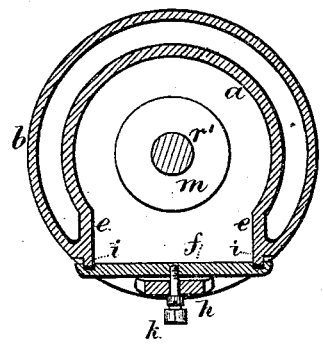
Figure 3:
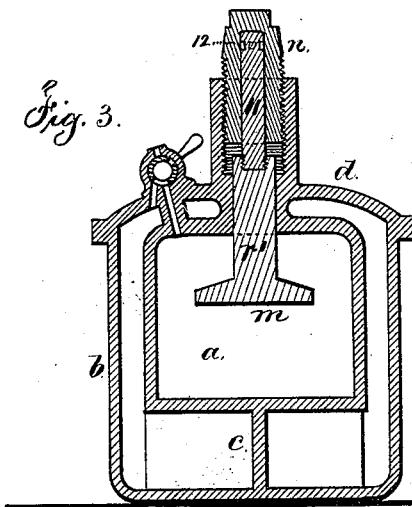

In the drawings, Figure 1 is a vertical section of the vulcanizing apparatus. Fig. 2 is a sectional plan, and Fig. 3 is a section of a modification in the cover of the apparatus.

The internal vessel, $a$, is of a suitable size for the dental molds, and the outer vessel, $b$, is larger, leaving a sufficient space for water between the two vessels. It is preferable to cast these two vessels, $a$ and $b$, together, and connect them by vertical cross-plates $c$ between the bottoms. The cover $d$ may also be cast at the same time with the vessels $a$ $b$, as seen in Fig. 3, there being the necessary space between the top of the vessel $a$ and said cover $d$, or else said cover $d$ may be bolted upon the top of the vessel $b$, as seen in Fig. 1. If this cover is movable it is necessary to provide packings at 2 and 3 to make the vulcanizing-vessel tight.

The cylindrical portions of the vessels $a$ $b$ are united at $e$, and an opening is made through the side to obtain access to the inner vessel for introducing or withdrawing the dental molds; and around the opening there is a projecting rib, $i$, against which the yielding packing in a groove around the door $f$ is pressed to make a tight joint when the door is closed. It is preferable to use the movable cross-bar $h$, that passes at its ends into grooves above and below the doorway, and a screw, $k$, serves to apply the necessary pressure to keep the door tight.

When the door is opened it can be turned down level and held by hooks at its lower corners, that act like hinges, the same as in drop-oven doors, so that the door becomes a platform for the molds in entering or withdrawing the same.

I prefer to introduce glass windows in the door, so that the molds may be observed without the necessity of opening the door, such glasses being secured in the metal door by a clamping-frame or in any suitable manner.

The pressure is applied to the molds by the screw $n$ and follower $m$, or it may be done in any other manner. I do not limit myself in this particular; but I have shown an improved construction that is not liable to the objections that have heretofore been experienced in cases where the screw passes through the top of the chamber. I make the follower $m$ with a smooth rod, $r'$, passing through the packing at 10, and thereby prevent steam reaching the screw $n$ and rusting the same; and in order to allow the follower $m$ and rod $r'$ to move up and down without revolving with the screw, I employ the rod 11, that passes into the hollow screw $n$, and is provided with a neck that receives the cross-pin 12. By this construction the pressure is applied to the end of the rod 11 and there is but little friction; hence the attendant is better able to judge of the force that is applied to the molds themselves to close them, and the risk of injury is lessened.

At $s$, I have shown a thermometer, the same being in a suitable metal case or plug screwed into the cover of the apparatus, and a safety-valve or fusible plug may also be added to the apparatus.

In order to admit steam into the vulcanizing-chamber I employ a valve or cock, and the same is constructed so as to shut off the steam when it is desired to employ only a dry heat. In most instances it is preferable to cure or vulcanize the dental plate in the presence of steam, and then to shut off such steam when the process is being completed.

The tubular valve $v$ (shown in Fig. 1) has a screw-cap upon the top; hence it allows steam to pass into the vulcanizing-chamber when the valve is unscrewed, and when screwed to its seat the steam is excluded, and the screw-cap $w$ or a cock can be opened to allow the steam to pass out of the vulcanizing-chamber.

In Fig. 3 a three-way cock is shown for admitting steam to the vulcanizing-chamber or shutting the same off, or allowing the steam to escape.

I claim as my invention—

1. The combination, with a dental vulcanizing-vessel, of an outer vessel surrounding, or nearly so, the vulcanizing-vessel, so as to obtain uniformity in the action of the heat, substantially as set forth.

2. The combination, with the vulcanizing-vessel $a$ and exterior vessel, $b$, of a movable door applied to an opening in the side of the vessels, substantially as set forth.

3. In a vulcanizing apparatus, a door connected at its bottom edge with the vessel, so as to form a platform when open, in combination with the packing around the door, and a screw or its equivalent to close the door tightly, substantially as set forth.

4. The combination, with the vulcanizing-vessel $a$, inclosing-vessel $b$, and door $f$, of the cocks or valves to admit steam into the vessel or exclude the same, substantially as set forth.

5. The combination, with the screw $n$ and follower $m$, of the smooth rod $r'$, packing 10, and the rod 11, which enters the hollow screw $n$, substantially as set forth.

Signed by me this 16th day of December, A. D. 1878.

JOHN S. CAMPBELL.

Witnesses:
WILLIAM G. MOTT,
GEO. T. PINCKNEY.